Figure 1:
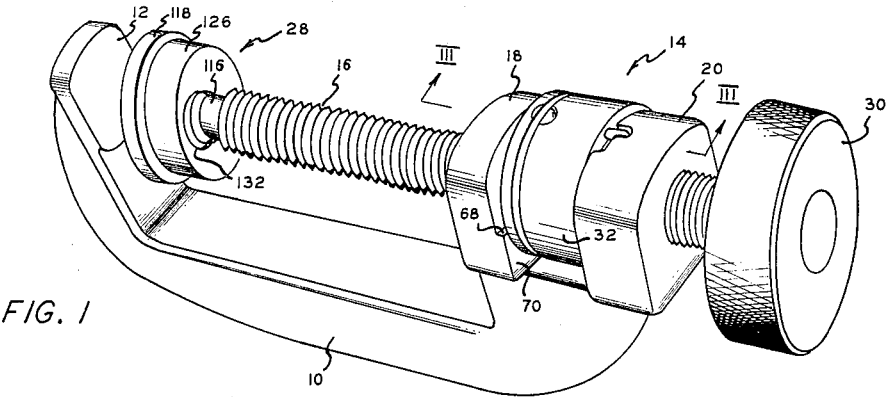

Nov. 23, 1965    H. H. MERRIMAN    3,219,336
QUICK ACTING PRESSURE UNIT
Filed Oct. 10, 1962    2 Sheets-Sheet 1

INVENTOR.
HENRY H. MERRIMAN
BY
Beaman Beaman
attys

Nov. 23, 1965    H. H. MERRIMAN    3,219,336
QUICK ACTING PRESSURE UNIT
Filed Oct. 10, 1962    2 Sheets-Sheet 2
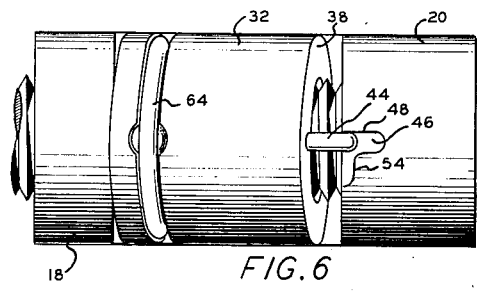
FIG. 6
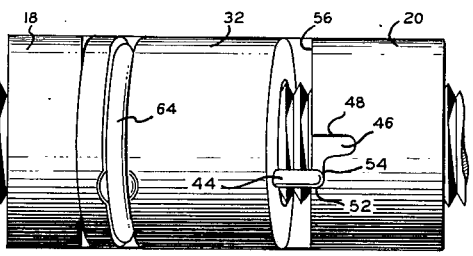
FIG. 7
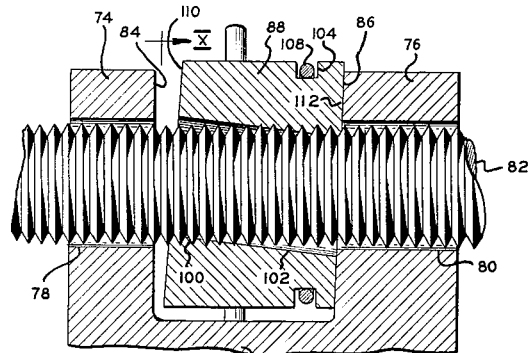
FIG. 9
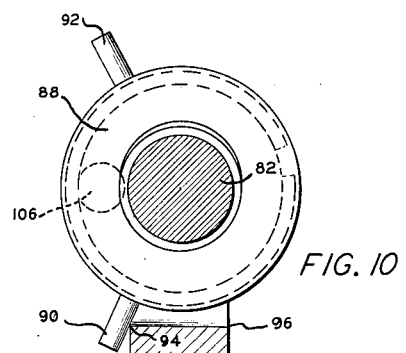
FIG. 10
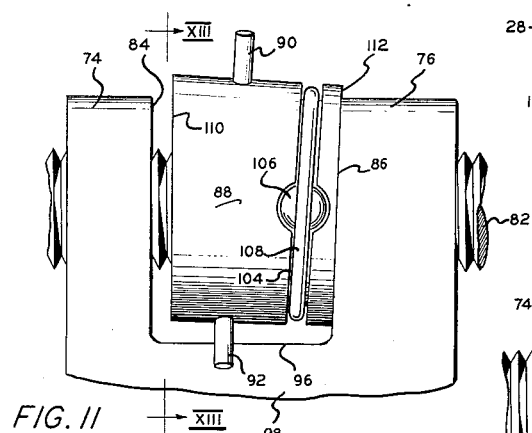
FIG. 11
FIG. 14    FIG. 15
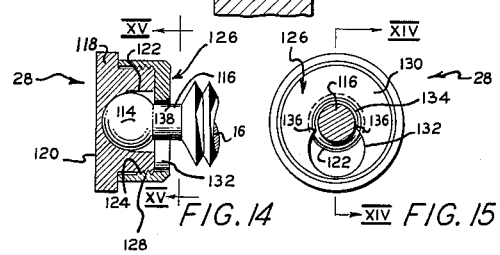
FIG. 12
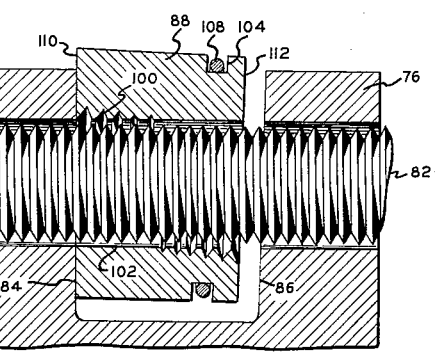
FIG. 13
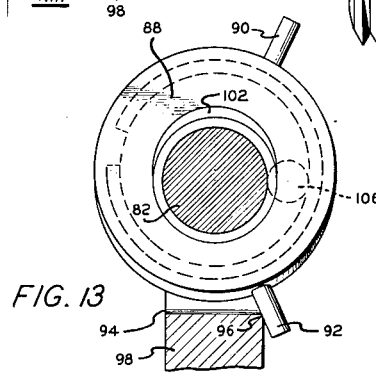
INVENTOR.
HENRY H. MERRIMAN United States Patent Office 3,219,336
Patented Nov. 23, 1965

1

3,219,336
QUICK ACTING PRESSURE UNIT
Henry H. Merriman, 751 W. Washington St.,
Jackson, Mich.
Filed Oct. 10, 1962, Ser. No. 229,553
16 Claims. (Cl. 269—187)

The invention pertains to a pressure unit of the screw type, and particularly relates to this type of pressure unit which is capable of a rapid traverse for adjustment purposes.

The pressure unit of the invention is of the type which may be employed with, but is not limited to, C clamp applications. The invention is of the type wherein a threaded shaft is employed in combination with a threaded bore to produce a clamping or compression force by axially translating the shaft due to rotation of the shaft relative to the bore, and thereby producing an axial feeding movement of the shaft. Devices employing this type of pressure unit such as C clamps, vises, and a number of special-purpose fixtures such as those employed in the metal-forming arts, have the disadvantage of requiring tedious rotation of the threaded shaft to accommodate various sizes of members to be clamped by the shaft and associated anvil or fixed jaw. To alleviate the tedious and time-consuming shaft rotation required to adjustably position this type of threaded shaft pressure unit construction, rapid traverse or quick-acting devices have been employed with C clamps, vises, and the like, whereby means are provided for temporarily disengaging the threads of the bore or a nut from the shaft to permit the shaft to be axially translated very quickly and easily without rotation of the shaft. The invention is directed to this type of quick-acting pressure unit.

It is a basic object of the invention to provide a rapid traverse pressure unit employing a nut and threaded shaft arrangement wherein the nut may be shifted between operative and inoperative relationships with the shaft solely by direct manipulation of the shaft itself, whereby only one-hand operation is required to shift between the rapid traverse and nut feed conditions.

A further object of the invention is to provide a rapid traverse pressure unit which is of economical construction, which does not require special equipment in the manufacture thereof, yet is dependable in operation, and requires no special skills or dexterity on the part of the operator.

Another object of the invention is to provide a rapid traverse pressure unit employing a nut and threaded shaft arrangement wherein shifting between the nut thread feed and rapid traverse positions of the unit is produced by the manipulation of the threaded shaft, and means are employed whereby positioning of the nut between the rapid traverse operative and inoperative positions is accomplished by like movements of the threaded shaft.

Yet another object of the invention is to provide a rapid traverse pressure unit employing a threaded shaft and nut arrangement wherein friction means interposed between the nut and threaded shaft aid in automatically shifting the nut from an inoperative to an operative thread feed position, and the friction means is adjustable whereby the force required to axially translate the threaded shaft during rapid traverse may be varied.

2

Another object of the invention is to provide a quick-acting pressure unit which is of long wearing character, and is of very concise and relatively simple construction so that it may be readily incorporated in hand-held clamps of relatively small size.

A further object of the invention is to provide a pressure unit foot embodying a universal pivot connection of the ball-and-socket type wherein the connection may be readily disassembled.

An additional object of the invention is to provide a pressure foot for the end of a shaft wherein a ball is defined on the shaft and a socket is defined on the pressure foot, and releasable means maintain the ball within the socket.

Figures 2, 3:
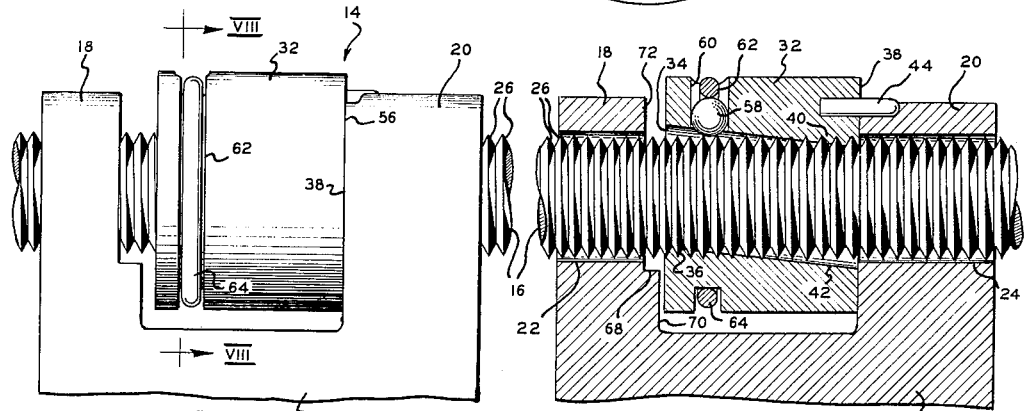
Figures 4, 5:
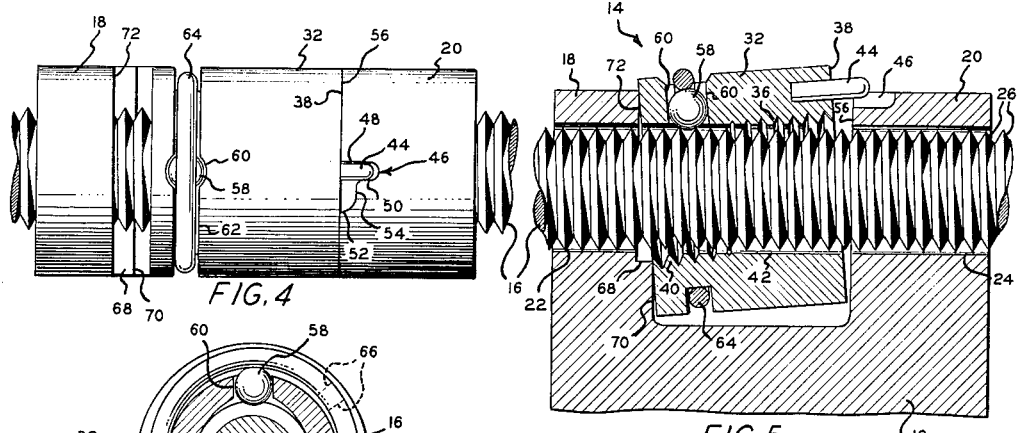
Figure 8:
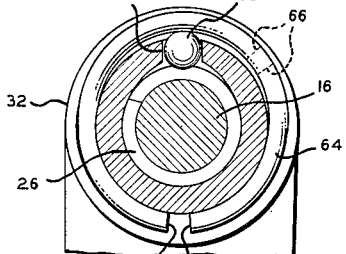

These and other objects of the invention arising from the relationships and details of the components of embodiments of the invention will be apparent from the following description and accompanying drawings wherein:

FIG. 1 is a perspective view of a C clamp employing the inventive concept, illustrating the nut in the operative threaded position, FIG. 2 is an elevational, enlarged view of the threaded shaft, nut and support means showing the nut in the operative position for producing a compressive force by the threaded shaft, FIG. 3 is an elevational, sectional view of the rapid traverse pressure unit structure as taken along section III—III of FIG. 1, FIG. 4 is a plan view of the pressure unit structure with the nut in the position as in FIG. 2, FIG. 5 is an elevational, sectional view of the pressure unit structure showing the nut in the forward position and tilted to the inoperative and forward sliding rapid traverse relation with the threaded shaft, FIG. 6 is a top plan view of the pressure unit with the components in the relationship shown in FIG. 5, FIG. 7 is a top plan view of the pressure unit components wherein the nut has been rotated to the locked position for permitting the threaded shaft to be rapid traversed, FIG. 8 is an elevational, sectional view taken along line VIII—VIII of FIG. 2, FIGS. 9 through 13 are directed to another embodiment of the invention, and FIG. 9 is an elevational, sectional detail view of the pressure unit shown with the nut in the operative threaded position, FIG. 10 is an elevational, sectional view taken along section X—X of FIG. 9, FIG. 11 is an elevational view of the modification of pressure unit showing the nut in the rapid traverse position when the shaft is being moved to the right, FIG. 12 is an elevational, sectional view of the pressure unit embodiment wherein the nut is in the rapid traverse position and the threaded shaft is being moved to the left, FIG. 13 is an elevational, sectional view taken along section XIII—XIII of FIG. 11, FIG. 14 is an elevational, sectional view of the removable pressure foot attached to the threaded shaft taken along sections XIV—XIV of FIG. 15, and FIG. 15 is an elevational, sectional view of the pressure foot taken along section XV—XV of FIG. 14.

For purposes of illustration, the pressure unit of the invention will be described as employed with a C clamp. However, it will be appreciated that the pressure unit may be employed with any type of apparatus wherein it is desired to employ a threaded shaft to produce a clamping or compression pressure. The C clamp includes the usual C-shaped body member 10 having a fixed jaw or anvil 12 defined at one end, and a pressure unit 14 is defined at the other end.

The pressure unit 14 consists of the apparatus shown in FIGS. 2 and 3 wherein the support for a threaded shaft 16 includes spaced elements or bosses 18 and 20 which are an integral part of, or firmly attached to, the C clamp body. The bosses 18 and 20 are provided with coaxial bores 22 and 24, respectively, which are of sufficient diameter as to support the threaded shaft 16 for axial sliding movement therethrough.

The threaded shaft 16 is threaded throughout its length with threads 26, and is provided at the inner end, which is disposed in opposed relation to the fixed jaw 12, with a pressure foot 28, which is pivotally mounted upon the threaded shaft by a ball-and-socket arrangement which will be later described. The other end of the shaft 16 is provided with a knob or handle 30 to facilitate rotation of the shaft.

The nut 32 may be of a generally cylindrical configuration, and is located in the space between the bosses 18 and 20. It will be noted that the axial length of the nut 32, with respect to the axis of the threaded shaft, is less than the distance separating the bosses. Nut 32 is provided with an opening or passage extending therethrough, generally indicated by numeral 34, through which the threaded shaft 16 extends whereby the nut will be located upon the shaft between the bosses 18 and 20. The opening 34 is formed by a pair of substantially cylindrical, linear bores, having axes which intersect and are angularly offset with respect to each other. Bore 36 is concentric with the exterior configuration of the nut and its axis perpendicularly intersects the right or rear surface 38 of the nut 32. The bore 36 is provided with threads 40 complementary to the threads 26 defined upon the threaded shaft.

A cylindrical, smooth bore 42 also forms the opening 34 and the axis of the bore 42 is angularly related to the axis of the bore 36 and intersects the axis thereof substantially centrally intermediate the left and right ends of the nut, as represented in FIG. 3. The diameter of the bore 42 is at least as large as the maximum diameter of the shaft 16 and the threads 26 defined thereon whereby, upon tilting of the nut 32, as in FIG. 5, wherein the axis of bore 42 will become coaxial with the axis of the threaded shaft 16, the threaded shaft may longitudinally slide relative to the nut through the bore 42 and opening 34. With the nut tilted to this inoperative or rapid traverse position, it will be appreciated that the threads of the bore 36 do not engage the threads of the shaft 16.

The nut 32 is provided with locating or positioning means which is preferably in the form of a projection or pin 44 extending from the surface 38 toward the boss 20. The upper surface of the boss 20 is provided with locating means in the form of an irregularly shaped recess 46, FIG. 4. The recess 46 is defined by substantially parallel walls 48, 50, and 52, and another wall 54 is defined at a distance from the thrust bearing surface 56 of the boss which is less than the distance the projection 44 extends from the surface 38. The thrust bearing surface 56 of the boss 20 is disposed at right angles to the axis of the bore 24 whereby, upon the surface 38 of the nut engaging the thrust bearing surface 56, the axes of the threaded shaft 16 and nut bore 36 will be parallel and coaxial.

An important advantage of the invention lies in the fact that the rapid traverse of the threaded shaft 16, in either direction, may be accomplished by one-handed operation. Thus, it is only necessary for the operator to grasp the shaft knob 30 to facilitate shifting the nut between the thread operation and rapid traverse positions, and no further locking or positioning operations are necessary, as is the case with many rapid traverse devices.

To insure that the nut 32 will respond to manipulation of the shaft 16, friction means are interposed between the nut and shaft. In the preferred embodiment, such friction means take the form of a hardened ball or spherical detent 58 received with a radial opening 60 defined in the nut 32 which intersects both the external surface and opening 34 thereof. An annular groove 62 is defined about the nut 32 and intersects the opening 60 for receiving a circular spring 64. The spring 64 is defined by terminating ends 66, as well be appreciated from FIG. 8. The normal annular configuration of the spring 64 is such that the spring will engage the detent 58 and continually bias the detent into engagement with the shaft threads 26. The detent 58 is of such diameter that the convex surface thereof will ride over the peaks of the threads 26 as the threaded shaft is axially translated relative to the nut during the rapid traverse movements. However, the convex surface of the detent will also engage the peaks of two adjacent threads in a releasable threading relationship, and the opening 60 is so positioned with respect to the threads 40 of the nut bore 36 that when the shaft threads 26 mate with the bore threads 40, the detent 58 will always be engaging a pair of shaft threads 26. The purpose of this relation will be later described.

As will be apparent from FIG. 3, the boss 18 is provided with a step 68 whereby a surface 70 is disposed closer to the nut 32 than is the surface 72. This construction permits the nut 32 to tilt when the nut is moved forward, as shown in FIG. 5.

The operation of the pressure unit will now be described in conjunction with FIGS. 1 through 7.

The normal relationship of the nut 32 will be as shown in FIGS. 1 through 4. In this relationship the projection 44 is received within the enlarged portion of the recess 46 which permits the nut surface 38 to coplanarly abut the thrust bearing surface 56 of boss 20. In this position the axis of the threaded nut bore 36 will coincide with the axes of the shaft 16 and the bores 22 and 24. Thus, the threads 26 of the shaft will be in mating engagement with the threads 40 of the bore 36. As the projection 44 is received within the recess 46, between the walls 48 and 50 thereof, the nut 32 is restrained against rotation relative to the shaft 16 and, thus, rotation of the shaft by the knob 30 will axially translate the shaft and pressure foot 28 toward or away from the fixed jaw 12. Normally, in this position of the components, the operator rotates the knob 30 in a clockwise direction, FIG. 1, which screws the shaft 16 toward the jaw 12 to clamp a member between the jaw 12 and the foot 28. As the nut 32 is in firm engagement with the boss 20, the reaction to the clamping compression force is being transmitted from the shaft through the nut to the boss 20.

When it is desired to release the member being clamped between the foot 28 and the jaw 12, and to adjust the shaft 16 for the accommodation of a larger or smaller member to be clamped, the operator first rotates the knob 30 in the counterclockwise direction to remove the clamping force from the nut 32 and back the foot 28 away from the member being clamped thereby. Approximately one turn of the knob 30 in the counterclockwise direction is sufficient for this purpose. The backing off of the shaft 16 from the clamped member permits the operator to slightly shift the shaft 16 in the forward direction toward the jaw 12. Such shifting is produced by an axial sliding of the shaft 16 within the bores 22 and 24 of the supporting bosses. The friction detent 58 insures that the axial sliding movement of the shaft is also imparted to the nut 32 and such movement will cause a tilting of the nut, as shown in FIG. 5, due to the engagement of the lower part of the nut with the surface 70, and the tilting is limited by the engagement of the upper portion of the nut with the surface 72. The resultant tilting of the nut 32 is sufficient to align the axis of the bore 42 with the axis of the shaft 16, as described above. It will be appreciated that at this position of the nut the operator may axially slide the shaft 16 to the left, FIG. 5, through nut 32 wherein the detent will "ride over" threads 26, if it is desired to shift the foot 28 to a closer position relative to the jaw 12. Thus, a rapid traverse relationship between the nut and shaft 16 is produced. If the only direction of rapid traverse desired for this particular operation is toward the jaw 12, upon engagement of the foot 28 with the clamped member interposed between the foot and jaw, the operator then proceeds to rotate the shaft knob 30 in the clockwise direction. Such clockwise rotation of the shaft 16 will cause the nut 32 to be moved toward the surface 56, due to the engagement of the detent 58 with the threads 26 of the shaft. It will be noted in FIG. 5 that the projection 44 is still in an abutting relationship with the wall 48 of the recess 46 and, thus, rotation of the nut 32 relative to the boss 20 is prevented. One revolution, or less, of the shaft 16 is sufficient to engage the nut surface 38 with the boss surface 56 and again establish the relationship shown in FIGS. 1 through 4 for tightening the clamp by means of threads 26 and 40.

Often, once the nut has been shifted to the position of FIG. 5, it is desired to rapidly withdraw the foot 28 from the jaw 12 to permit a member of larger size to be inserted between the jaw and foot. Thus, after the nut has tilted forward, as shown in FIGS. 5 and 6, the knob 30 is rotated counterclockwise, FIG. 1, a few degrees to align the end of the projection 44 with the recess wall 54. Wall 52 limits counterclockwise rotation of the nut and assures alignment of the projection with wall 54. This relationship will maintain the nut 32 in the tilted position, wherein bore 42 is coaxially aligned with shaft 16 even though the shaft is moved to the right, FIG. 5. The tilted rapid traverse relationship of the nut is maintained by the engagement of the end of projection 44 and the wall 54 as the shaft is moved to the right, and it will be appreciated that during the rapid traverse of the shaft relative to the nut, that the detent 58 rides over the threads of the shaft 26, and such radial movement of the detent is permitted by the spring 64.

With the projection 44 in the rapid traverse position shown in FIG. 7, rotation of the nut 32, in a counterclockwise direction, with respect to FIG. 1, is prevented by engagement of the projection with the recess wall 52. Therefore, it is not possible to rotate the shaft excessively in a counterclockwise direction. With the nut in the position as shown in FIG. 7, the shaft 16 may be axially translated with a sliding movement through the bores 22 and 24 and the nut 32 in either direction to provide a complete rapid traverse adjustment. When it is desired to clamp a member between the jaw 12 and foot 28, the shaft 16 is merely rotated in the clockwise direction which initially rotates the nut clockwise and shifts the projection 44 to the relationship of FIGS. 5 and 6, whereby the projection engages the wall 48, and continued rotation of the shaft will straighten the nut whereby the surface 38 will coplanarly engage the boss surface 56 and, thus, align the threaded bore 36 with the axis of the shaft 16, to establish the operative threaded nut and shaft relationship for tightening the pressure foot against the clamped member.

For a given diameter of detent ball 58, the force required to axially translate the shaft 16 during rapid traverse is dependent upon the biasing force maintaining the engagement of the detent with the shaft threads 26. This biasing force may be varied by rotating the ring spring 64 relative to the nut 32 and the detent 58. For instance, if the ring spring 64 is rotated whereby the ends 66 thereof are positioned as shown in the dotted lines of FIG. 8 wherein the ends are relatively adjacent the detent 58, the biasing force imposed upon the detent by the spring ring is considerably less than that when the ends 66 are located in the full-line position of FIG. 8 diametrically opposed to the detent, due to the fact that the full-line position directs a greater percentage of the biasing force upon the detent than if the ends of the spring ring are disposed adjacent the detent. Such adjustment of the detent friction characteristics is useful to adapt the pressure unit for the particular situation in which it is employed. For instance, if the unit is so located that the shaft 16 moves in a vertical direction, a strong biasing force upon the detent 58 is desirable to prevent the weight of the shaft from causing axial sliding relative to the nut when the nut is in the rapid traverse position.

Another embodiment of the invention wherein the basic inventive concepts are employed is shown in FIGS. 9 through 13. In this embodiment the support means includes a pair of spaced bosses 74 and 76. The bosses include smooth-walled bores 78 and 80 in which the threaded shaft 82 is axially translatable in a manner similar to the above described embodiment. The shaft 82 is provided with an operating handle or knob at the right end, FIG. 9, not shown, and a pressure foot at the left end, also not shown. The surface 84 of the boss 74 is perpendicularly disposed to the axis of the shaft 82, while the thrust bearing surface 86 of the boss 76 is inclined upwardly away from surface 84 at a small angle, for instance 8°.

The nut 88 having an exterior cylindrical configuration is mounted on shaft 82 and includes radially extending locating means in the form of pins 90 and 92 extending therefrom. The pins 90 and 92 are of such length as to engage the edges 94 and 96, respectively, of the supporting means 98, as shown in FIGS. 10 and 13, upon sufficient rotation of the nut in the desired direction.

An opening is defined through the nut 88, for receiving the shaft 82, and the opening is formed by a threaded bore 100 and a smooth bore 102, having an axis intersecting the axis of the threaded bore, in the manner identical to that described in the previous embodiment. An annular groove 104 is located on the exterior surface of the nut, and a radial bore intersects the groove for reception of the ball detent 106. The spring ring 108 received within the groove 104 biases the ball detent into engagement with the threads of the shaft 82 in the manner previously described.

The forward surface 110 of the nut 82 is substantially perpendicular to the axis of the bore 102. The rear nut surface 112 of the nut is obliquely related to the axis of the threaded bore 100, and is of an angle deviating from the perpendicular with respect to the axis of the bore 102 equal to the deviation of the surface 86 with respect to the perpendicular of the axis of the shaft 82. The surfaces 86 and 112 are so related that when the nut 88 is rotated wherein the pin 90 engages the supporting member edge 94, FIG. 10, the surfaces 86 and 112, upon engagement, render the threaded bore 100 coaxial with shaft 82 producing an operative threaded connection between the nut and shaft for tightening the shaft pressure foot upon a clamped member by rotating the shaft. As a counterclockwise rotation of the shaft 82, FIG. 10, moves the shaft to the left, FIG. 9, it will be appreciated that rotation of the nut 88 in this direction is prevented by the engagement of the pin 90 and supporting means edge 94.

With the nut in the position shown in FIG. 10, it is possible to move the shaft 82 in a rapid traverse movement to the left, FIG. 9, by merely pushing the shaft to the left. This action causes the nut 88 to move to the left until the foremost part of the nut surface 110 engages the boss surface 84 and thereby tilts the nut to the position wherein the surfaces 84 and 110 engage and become coplanar and align the shaft 82 with the smooth-wall bore 102. In this position the shaft is not in engagement with the threads of the bore 100 and may be rapidly traversed freely to the left, retarded only by the frictional engagement of the detent 106 upon the shaft threads. Movement of the shaft to the right again establishes the relationship shown in FIG. 9. It will be appreciated that the frictional contact of the detent upon the shaft insures the desired nut movement with the shaft, and the detent is located so as not to interfere with the nut tilting.

If it is desired to rapid traverse the shaft to the right, the operator merely rotates the shaft 82 clockwise, FIG. 10, whereby the nut will be rotated to the position shown in FIGS. 11 and 13 where pin 92 engages the support member edge 96. In this position of the nut, the nut has rotated 180° relative to the position of FIGS. 9 and 10. Thus, axial sliding of the shaft to the right will cause the surfaces 86 and 112 to engage in a coplanar relationship and these surfaces accumulatively define a nut angle which aligns the bore 102 with the axis of shaft 82, thereby permitting rapid traverse of the shaft to the right. It will be noted that when surfaces 86 and 112 are in engagement with the nut in this position, that the surfaces 84 and 110 are parallel, FIG. 11. Therefore, with the nut in the rotated position of FIGS. 11 and 13, if it is desired to rapid traverse the shaft to the left, it is only necessary for the operator to do so with a linear shaft movement. Movement of the shaft to the left causes the nut surface 110 to engage the surface 84. However, as these surfaces are already parallel, the bore 102 will remain aligned with the axis of the shaft 82 whereby the shaft may slide through the nut, as shown in FIG. 12.

When it is desired to tighten the pressure unit to produce the high clamping forces obtainable with the nut and shaft relationship, it is only necessary to rotate the shaft in the direction to restore the nut to the position of FIGS. 9 and 10, wherein engagement of the surfaces 86 and 112 once again aligns the threaded bore 100 of the nut with the shaft 82.

Of the two described embodiments of the invention, the embodiment of FIGS. 1 through 7 is preferable in that the embodiment of FIGS. 9 through 13 requires a greater degree of nut movement to shift the nut between the rapid traverse and thread feed positions.

The end of shaft 16 is provided with a spherical ball 114 which connects to the shaft by means of a cylindrical neck 116 of reduced diametrical dimension with respect to ball 114. The pressure foot 28 includes a pad 118 having a clamped member engaging surface 120, and a socket 122 is defined within the pad having a concave surface substantially complementary to that of ball 114 and of a size so as to receive the ball. A threaded portion 124 is defined on the pad concentric with the socket 122.

The pressure foot 28 also includes a retainer member 126 which is of an annular configuration having an internal thread 128, which is adapted to mate with threads 124, and a radial wall 130. The wall 130 is provided with a large circular opening 132 which is of a diameter at least slightly larger than that of ball 114, and the axis of opening 132 is eccentrically related to the axis of retainer 126. A second circular opening 134 is defined in retainer wall 130 coaxially related thereto. As will be apparent from FIG. 15, the opening 134 is smaller than opening 132 and is of a diameter smaller than that of ball 114 but greater than that of neck 116. The openings 132 and 134 intersect in such a manner that the distance separating opening intersections 136 is greater than the diameter of neck 116.

To attach the pressure foot 28 to the shaft 16 the retainer 126 is positioned relative to the shaft so that ball 114 is inserted through opening 132. Thereupon, the retainer is moved radially to slip the neck 116 between intersections 136 and into coaxial relation with opening 134. The pad 118 is then aligned with the retainer wherein threads 124 and 128 will mate and rotation of the pad relative to the retainer will affix the ball 114 within socket 122. As will be apparent from FIG. 14, the assembled components are so dimensioned that the retainer retains the ball within socket 122 preventing significant axial movement of the foot relative to the shaft, and the fact that opening 134 is of larger diameter than neck 116, permits the pressure foot to swivel on the ball 114 providing universal adjustment of the foot upon the shaft. If desired, the outer edge of opening 134 may be countersunk to provide a conical surface 138 for increasing the degree of swivel adjustment. As the socket 122 prevents alignment of opening 132 with ball 114, the pressure foot cannot be inadvertently removed from the shaft 16.

Removal of the pressure foot from the shaft 16 is accomplished by reversing the assembly steps described above. As it is often desired to weld a fixture to the pad 118, or employ a custom-shaped pad with a pressure unit, the easily facilitated assembly and disassembly of the pressure foot construction is of considerable advantage over those constructions wherein the pressure foot is permanently attached to the threaded shaft as by swaging or the like.

From the above description it will be apparent that the pressure unit of the invention permits the nut to be shifted between a rapid traverse and a thread feed position merely by manipulation of the threaded shaft, and no auxiliary locking levers or other devices are necessary. Also, rapid traverse to close the unit may be achieved merely by axially shifting the shaft. Shifting of the nut from the thread feed position to the rapid traverse position is merely a matter of grasping the shaft handle with one hand and rotating and shifting the shaft slightly to obtain the rapid traverse operation in either shaft direction of movement. To render the nut operative, the shaft need merely be rotated in the usual direction, and the friction detent insures that the nut will always respond to the shaft movement and automatically be shifted to the operative position.

It will be understood that various modifications to the invention may be apparent to those skilled in the art without departing from the spirit and scope thereof, and it is intended that the invention be defined only by the following claims.

I claim:

1. A rapid traverse pressure unit comprising, in combination, a threaded shaft, support means supporting said threaded shaft for axial sliding movement relative thereto, a nut, means permitting limited axial movement of said nut, an opening defined in said nut and extending therethrough, said shaft extending through said opening, said opening being defined by first and second intersecting bores, threads defined in said first bore complementary to the threads of said threaded shaft, said second bore being of such diametrical dimension as to permit axial sliding of said threaded shaft relative thereto, said nut being positionable on said shaft between a first axial position aligning the shaft with said first bore providing threaded connection between said nut and shaft and a second axial position aligning said shaft with said second bore producing a slidable relation between said shaft and nut, means limiting axial movement of said nut relative to said support means, means selectively maintaining said nut in said first axial position, means selectively maintaining said nut in said second axial position, and friction means interposed between said shaft and nut whereby said nut is shifted between said means selectively maintaining the nut in said first and second axial positions by manipulation of said shaft.

2. In a pressure unit, as in claim 1, wherein said friction means include a threaded shaft engaging member mounted on said nut, and spring means biasing said shaft engaging member toward said shaft.

3. In a pressure unit, as in claim 2, wherein said spring means is adjustable whereby the biasing force exerted thereby may be varied.

4. In a pressure unit, as in claim 2, wherein said friction means comprises a detent having a convex surface adapted to simultaneously contact two adjacent shaft threads in feeding relation.

5. A rapid traverse pressure unit comprising, in combination, a threaded shaft, support means supporting said threaded shaft for axial sliding movement relative thereto, a nut, an opening defined in said nut and extending therethrough, said shaft extending through said opening, said opening being defined by first and second intersecting bores, threads defined in said first bore complementary to the threads of said threaded shaft, said second bore being of such diametrical dimension as to permit axial sliding of said threaded shaft relative thereto, said nut being positionable on said shaft between a first position aligning said shaft with said first bore providing a threaded connection between said nut and shaft and a second position aligning said shaft with said second bore producing a slidable relation between said shaft and nut, means limiting axial movement of said nut relative to said support means, friction means interposed between said nut and threaded shaft, first and second abutment means fixed relative to said support means, abutment means defined on said nut adapted to selectively engage said first and second abutment means whereby engagement of said first and nut abutment means locates said nut for positioning to said first position and engagement of said second and nut abutment means maintains said nut in said second position.

6. In a pressure unit as in claim 5, wherein said first and second abutment means are formed by a recess defined in said support means and said abutment means defined on said nut comprises a projection extending from said nut into said recess.

7. A rapid traverse pressure unit comprising, in combination, a threaded shaft, support means supporting said threaded shaft for axial sliding movement relative thereto, a nut, an opening defined in said nut and extending therethrough, said shaft extending through said opening, said opening being defined by first and second intersecting bores, threads defined in said first bore complementary to the threads of said threaded shaft, said second bore being of such diametrical dimension as to permit axial sliding of said threaded shaft relative thereto, said nut being positionable on said shaft between a first position aligning said shaft with said first bore producing a threaded connection between said nut and shaft and a second position aligning said shaft with said second bore producing a slidable relation between said shaft and nut, means limiting axial movement of said nut relative to said support means, a friction member mounted on said nut frictionally engaging said threaded shaft, a projection mounted upon and extending from said nut, a recess defined in said support means having first and second walls adapted to selectively engage said projection whereby engagament of said projection with said first wall positions said nut for movement to said first position and engagement of said projection with said second wall positions said nut in said second position, said friction member permitting selective engagement of said projection and walls by manipulation of said shaft.

8. A rapid traverse pressure unit comprising, in combination, a threaded shaft, support means supporting said threaded shaft for axial sliding movement relative thereto, a nut, an opening defined in said nut and extending therethrough, said shaft extending through said opening, said opening being defined by first and second intersecing bores, threads defined in said first bore complementary to the threads of said threaded shaft, said second bore being of such diametrical dimension as to permit axial sliding of said threaded shaft relative thereto, said nut being positionable on said shaft between a first position aligning the shaft with said first bore providing a threaded connection between said nut and shaft and a second position aligning said shaft with said second bore producing a slidable relation between said shaft and nut, said support means including a thrust-bearing surface disposed adjacent said nut and engageable thereby when said nut is in said first position whereby said shaft may produce an axial force, means restraining said nut against rotation when said nut is engaging said thrust-bearing surface and said shaft is rotated in the direction to produce the operative pressure, nut positioning means disposed on said support means in opposed relation to said thrust-bearing surface, engaging and positioning said nut relative to said shaft to said second position upon said shaft being axially translated to move said nut away from said thrust-bearing surface, and means defined on said support means cooperating with said nut maintaining said nut in said second position.

9. In a pressure unit, as in claim 8, wherein friction means are mounted on said nut frictionally engaging said shaft, said nut being rotatable relative to said support means upon being moved to said second position, and means limiting rotation of said nut to said second position.

10. In a pressure unit, as in claim 8, wherein said means maintaining said nut in said second position comprises an abutment surface defined on said support means and a projection mounted on said nut engageable with said abutment surface.

11. In a pressure unit, as in claim 10, wherein said means restraining said nut against rotation when said nut is engaging said thrust-bearing surface comprises a recess defined in said support means receiving said projection.

12. In a pressure unit, as in claim 8, wherein said thrust-bearing surface constitute cam surfaces obliquely related to the axis of said first bore and constitute the means for maintaining said nut in said second position.

13. A rapid traverse pressure unit comprising, in combination, support means, a threaded shaft mounted upon said support means for axial sliding translation thereto, said shaft being movable in a pressure producing forward direction and an adjusting rearward direction, a nut, an opening defined in said nut and extending therethrough, said shaft extending through said opening, said opening being defined by first and second intersecting bores having angularly related axes, threads defined in said first bore complementary to the threads of said threaded shaft, said second bore being of such diametrical dimensions as to permit axial sliding of said threaded shaft relative thereto, said nut being axially tiltable on said shaft between a first position aligning said shaft with said first bore providing a threaded connection between said nut and shaft and a second position aligning said shaft with said second bore producing a slidable relation between said shaft and nut, a thrust-bearing surface defined on said support means engageable by said nut upon said shaft being aligned with said first bore and being threaded in the forward direction, first locating means defined on said nut, second locating means defined on said support means cooperating with said first locating means permitting rotation of said nut relative to said support means between first and second rotative positions, friction means interposed between said nut and shaft whereby selective directional rotation of said shaft will selectively rotate said nut between said first and second rotative positions, tilting means defined on said support means for abutting engagement with said nut upon axially slidably translating said shaft in the forward direction tilting said nut to said second tiltable position, and means maintaining said nut in said second tiltable position upon rotation of said nut to said second rotative position, said nut being positionable against said thrust-bearing surface upon said nut being rotated to said first rotative position.

14. In a pressure unit, as in claim 13, wherein said first locating means comprises a projection defined on said nut and a recess defined in said support means having spaced, opposed walls receiving said projection, said walls comprising said second locating means.

15. In a pressure unit, as in claim 14, wherein said means maintaining said nut in said second tiltable position comprises a wall of said recess engageable with the end of said projection.

16. In a pressure unit, as in claim 13, wherein said friction means comprises a spring-biased detent having a convex shaft thread-engaging surface carried by said nut, said detent surface engaging two adjacent shaft threads upon said shaft mating with said nut threads when said nut is in said first tiltable position.

References Cited by the Examiner
UNITED STATES PATENTS

| | | | |
|---|---|---|---|
| 1,063,332 | 6/1913 | Diehl | 269—249 |
| 1,096,395 | 5/1914 | Schulz | 269—187 |
| 1,506,481 | 8/1924 | Graffan | 269—249 |
| 3,006,673 | 10/1961 | Swick | 287—87 |
| 3,095,224 | 6/1963 | Langen et al. | 287—87 |

ROBERT C. RIORDON, *Primary Examiner.*